United States Patent
Ben Abdelaziz et al.

(10) Patent No.: US 11,697,395 B2
(45) Date of Patent: Jul. 11, 2023

(54) INTRUSION DETECTION SYSTEM FOR A VEHICLE AND ASSOCIATED VEHICLE AND METHOD

(71) Applicant: FAURECIA INTERIEUR INDUSTRIE, Nanterre (FR)

(72) Inventors: Omar Ben Abdelaziz, Tille (FR); Alexander Van Laack, Royal Oak, MI (US)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/553,767

(22) Filed: Dec. 16, 2021

(65) Prior Publication Data
US 2022/0194319 A1 Jun. 23, 2022

(30) Foreign Application Priority Data
Dec. 17, 2020 (FR) .................. FR 20 13456

(51) Int. Cl.
| | |
|---|---|
| *B60R 25/31* | (2013.01) |
| *B60R 25/10* | (2013.01) |
| *G01S 13/04* | (2006.01) |
| *G01S 13/56* | (2006.01) |

(52) U.S. Cl.
CPC .......... *B60R 25/31* (2013.01); *B60R 25/1004* (2013.01); *G01S 13/04* (2013.01); *G01S 13/56* (2013.01)

(58) Field of Classification Search
CPC ..... B60R 25/31; B60R 25/1004; G01S 13/04; G01S 13/56; G08B 13/2491; G08B 13/187
See application file for complete search history.

(56) References Cited

U.S. PATENT DOCUMENTS

| | | | | |
|---|---|---|---|---|
| 7,036,390 | B2 * | 5/2006 | Tsuchihashi | G01V 3/12 73/865.9 |
| 11,230,293 | B2 * | 1/2022 | Gomez | G01S 13/66 |
| 11,378,671 | B1 * | 7/2022 | El Dokor | G01S 13/04 |
| 2013/0194089 | A1 * | 8/2013 | Estrada | G08B 21/22 340/584 |
| 2013/0314536 | A1 * | 11/2013 | Frank | B60R 21/0154 348/148 |
| 2015/0129343 | A1 * | 5/2015 | Teng | B60R 21/01534 180/271 |

(Continued)

FOREIGN PATENT DOCUMENTS

| | | |
|---|---|---|
| EP | 0787998 A2 | 8/1997 |
| EP | 0787998 A3 | 5/1998 |
| WO | 2020115066 A1 | 6/2020 |

OTHER PUBLICATIONS

French Search Report corresponding to French Application No. FR 2013456, dated Aug. 30, 2021, 2 pages.

*Primary Examiner* — Nay Tun
(74) *Attorney, Agent, or Firm* — Reising Ethington P.C.

(57) ABSTRACT

An intrusion detection system for a vehicle includes a radar sensor, a calculator, and an alarm system adapted to generate an alarm, the radar sensor being adapted to detect the presence of a body within the vehicle, the calculator being adapted to categorize each detected body as either a "human" category or an "other" category and to trigger the alarm system only when at least one of the detected body(ies) is categorized as "human". Also included is an associated vehicle and method.

11 Claims, 3 Drawing Sheets

(56) References Cited

U.S. PATENT DOCUMENTS

| | | | |
|---|---|---|---|
| 2017/0074980 A1* | 3/2017 | Adib | G01S 7/415 |
| 2018/0170213 A1* | 6/2018 | Lu-Dac | B60N 2/002 |
| 2018/0292529 A1* | 10/2018 | Hogasten | G01S 13/89 |
| 2018/0306917 A1* | 10/2018 | Fekete | G01S 13/56 |
| 2019/0097865 A1* | 3/2019 | Xu | A61B 5/4809 |
| 2019/0299897 A1* | 10/2019 | Gramenos | B60N 2/4235 |
| 2020/0158864 A1* | 5/2020 | Achour | B60Q 9/00 |
| 2020/0255002 A1* | 8/2020 | Chen | G01S 13/56 |
| 2020/0290567 A1* | 9/2020 | Funyak | B60R 25/34 |
| 2020/0326704 A1* | 10/2020 | Blanco | G05D 1/0287 |
| 2021/0107334 A1* | 4/2021 | Shtrom | B60H 1/0073 |
| 2021/0107380 A1* | 4/2021 | Jo | B60N 2/002 |
| 2021/0146867 A1* | 5/2021 | Dias Da Cruz | G01S 7/354 |
| 2021/0209927 A1* | 7/2021 | Hedges | G06V 20/593 |
| 2021/0245763 A1* | 8/2021 | Gomez | G01S 13/66 |
| 2021/0362673 A1* | 11/2021 | Jeon | B60H 1/00742 |
| 2022/0114817 A1* | 4/2022 | Gronau | G06T 7/277 |

* cited by examiner

INTRUSION DETECTION SYSTEM FOR A VEHICLE AND ASSOCIATED VEHICLE AND METHOD

TECHNICAL FIELD

The present invention relates to an intrusion detection system for a vehicle and related vehicle and method.

BACKGROUND

Such a system is particularly advantageous for detecting an intruder when the vehicle is parked.

Some existing systems use ultrasound to detect any movement within the vehicle and to generate an alarm when movement is detected.

However, any movement detected by the sensor triggers the alarm when the intrusion detection system is activated.

This can be caused by the movement of inanimate objects, such as falling objects or robots, but also by objects or animals passing by, in the case of a convertible, such as birds flying around the car, a ball or toy being thrown, or a pet.

Other systems detect the vibrations of the car.

However, this can be triggered by many external causes, such as a large vehicle driving by or a vehicle lightly bumping the equipped vehicle during parking maneuvers.

SUMMARY

One of the objectives of the present invention is therefore to provide a more selective intrusion detection system.

To this end, the invention relates to an intrusion detection system of the aforementioned type, comprising a radar sensor, a calculator and an alarm system adapted to generate an alarm, the radar sensor being adapted to detect the presence of a body inside the vehicle, the calculator being adapted to categorize each detected body as either a "human" category or an "other" category and to trigger the alarm system only when at least one of the detected body (bodies) is categorized as "human".

The categorization of each detected body as either a "human" or "other" category makes it possible to discriminate between the detected bodies and to be more selective, in relation to the triggering of the alarm, for example.

According to advantageous but optional aspects of the invention, the intrusion detection system may further have one or more of the following features, considered individually or in any technically possible combination:

the radar sensor is adapted to detect a body mass of each detected body, the calculator being adapted to categorize each detected body as either the "human" or the "other" category based on the shape of its detected body mass, the calculator is adapted to estimate a volume of the body mass of a body categorized as "human" and to determine whether said body is an adult or an infant or child according to the estimated volume, the radar sensor is adapted to use millimeter radio waves to detect millimeter movements, or the intrusion detection system further comprises an additional millimeter sensor using millimeter radio waves to detect millimeter movements, the millimeter radio waves having a frequency of between 24 GHz and 300 GHz, the calculator being adapted to determine whether detected millimeter movements correspond to breathing, the calculator is adapted to trigger the alarm system only when at least one of the detected body(bodies) is categorized as "human" and when detected millimeter movements corresponding to breathing are performed by said detected body, and/or the radar sensor is further adapted to detect the presence of a body around the vehicle, the calculator being adapted to monitor an approach of a detected body around the vehicle.

The invention further relates to a vehicle comprising an intrusion detection system as described above, the radar sensor being mounted on a vehicle body or trim element.

According to an advantageous but optional aspect of the invention, the radar sensor is arranged at a center of a ceiling of a vehicle passenger compartment, in a center console of the vehicle or on a center mirror assembly of the vehicle.

The invention further relates to a method of detecting an intrusion into a vehicle (12), comprising the following steps:

providing an intrusion detection system comprising a radar sensor, a calculator and an alarm system adapted to generate an alarm, detecting the presence of at least one body in the vehicle, the calculator categorizing each detected body as either a "human" or an "other" category, and the alarm system generating an alarm only when at least one of the detected bodies is categorized as "human".

According to one advantageous but optional aspect of the invention, the intrusion detection system is activated when the vehicle is locked in a parking mode.

BRIEF DESCRIPTION OF THE DRAWINGS

Further features and advantages of the invention will become apparent from the following description of embodiments of the invention, given by way of example only and with reference to the drawings in which.

DETAILED DESCRIPTION

Figure 1:
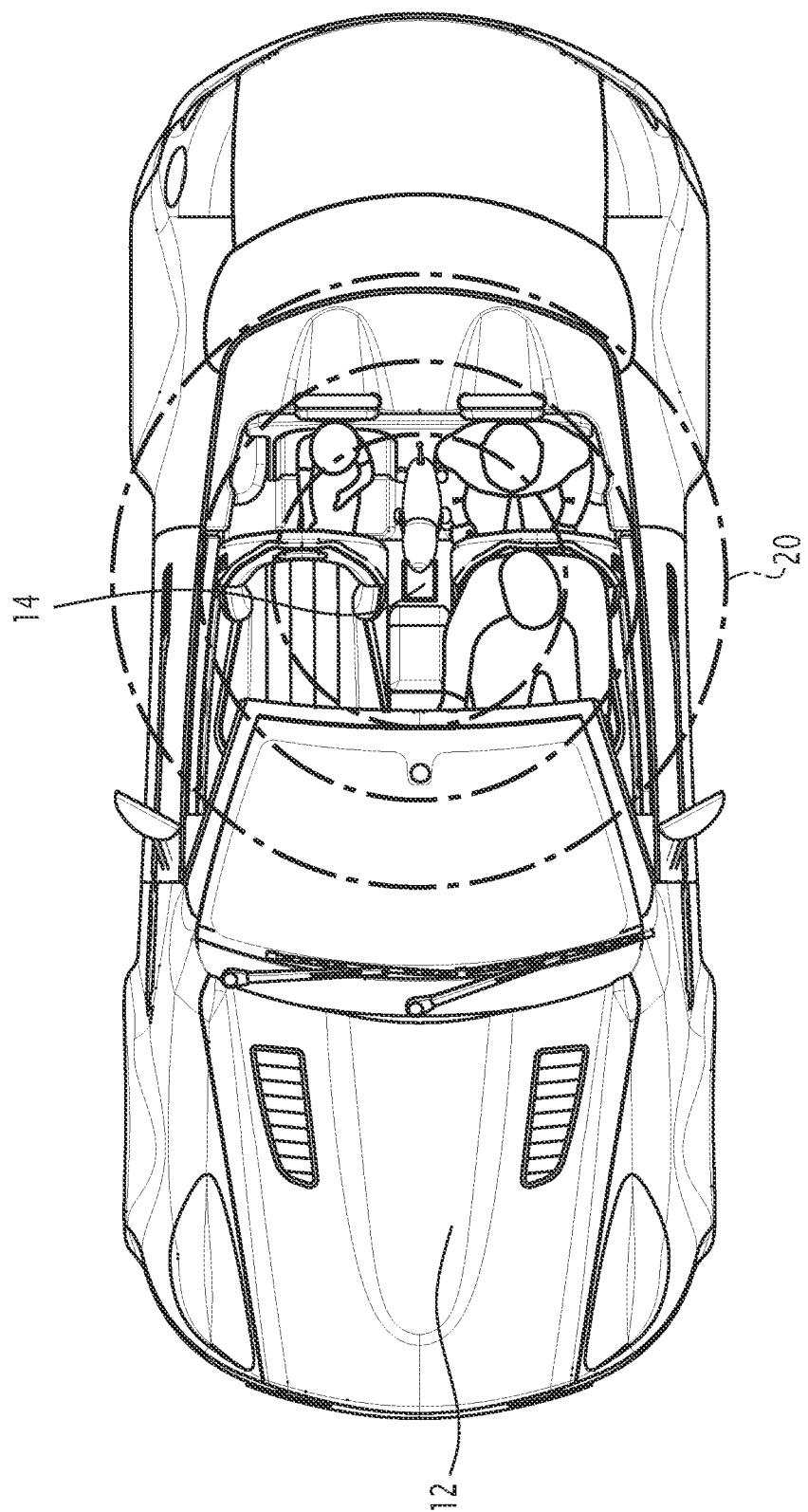
FIG. 1 is a view from above of a vehicle with a radar sensor of an intrusion detection system of the invention.
Figure 2:
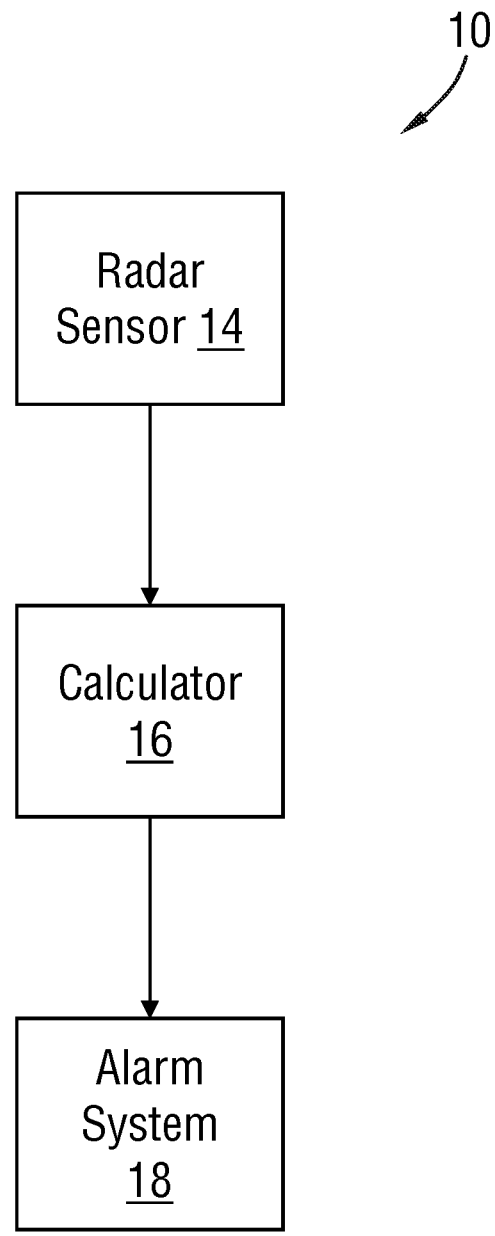
FIG. 2 is a schematic representation of an intrusion detection system of the invention according to one embodiment of the system of the invention.

An intrusion detection system 10 for a vehicle 12 such as a convertible vehicle according to one embodiment of the invention is shown schematically in FIG. 2 and partially in FIG. 1.

The intrusion detection system 10 is adapted to be activated and deactivated manually, with a button on a vehicle key, for example, or automatically when the vehicle is locked in a parking mode.

The intrusion detection system 10 comprises a radar sensor 14, a calculator 16 and an alarm system 18 adapted to generate an alarm.

The radar sensor 14 is, mounted on a body or trim element of the vehicle 12, for example.

The radar sensor 14 is arranged at a center of a ceiling of the vehicle interior, on a center console of the vehicle, for example, or on a mirror assembly of the vehicle.

The radar sensor 14 is adapted to detect the presence of a body within the vehicle 12, and possibly around the vehicle 12.

The radar sensor 14 is configured to generate radioelectric or radio waves having a frequency of between 3 kHz and 300 GHz.

In particular, the radar sensor 14 is configured to generate radio waves 20 having a frequency of between 24 GHz and 300 GHz.

The radar sensor is adapted to detect a body mass of each detected body by using the radio waves, specifically within a range of the radar sensor.

Mass is understood as the entire appearance detected as a whole.

The frequency range of the radar sensor is between 24 GHz and 300 GHz, for example.

In particular, the radar sensor 14 is adapted to map its surroundings in a heatmap based on reflected waves, corresponding to the radio waves generated by the radar sensor 14 and reflected by the bodies surrounding said radar sensor 14.

The abscissa and ordinate of each point of the heatmap correspond to the position of said point in relation to the radar sensor, the value of said point in the heatmap showing at least one parameter of the corresponding reflected waves.

This parameter is the reflectivity of the point, for example.

In one advantageous embodiment, the radar sensor 14 is configured to generate millimeter radio waves having a radio frequency of between 24 GHz and 300 GHz.

In a variant, in another advantageous embodiment, the intrusion detection system further comprises an additional millimeter sensor configured to generate millimeter radio waves having a radio frequency of between 24 GHz and 300 GHz.

The use of millimeter radio waves makes it possible to detect millimeter movements in the environment of the corresponding sensor by analyzing reflected millimeter radio waves, such as the movement, or rise and fall, of a human chest.

The radar sensor 14 is connected to the calculator 16, so as to communicate the measured data from the radar sensor 14 to the calculator 16.

The calculator 16 is adapted, more particularly configured, to categorize each body detected by the radar sensor 14, in particular with the reflected waves, between a "human" category or an "other" category.

The calculator 16 is adapted to categorize each detected body between the "human" category or the "other" category based on the shape of its detected body mass, more particularly the shape of its detected body mass on the heatmap.

More particularly, the calculator 16 is previously trained to recognize the shape of detected bodies, via a machine learning method, for example.

The calculator 16 has been trained to recognize the shape of a human at different stages of life and/or the shape of parts of a human at different stages of life, for example, such as the head, shoulders, etc.

For example, images, in particular heatmap images, have been provided to the calculator 16, with and without human(s), in order to learn to differentiate a human shape or partial shape(s) from other mass types, such as domestic animals or inanimate objects.

Further, in one advantageous embodiment, the calculator is adapted to determine whether a body categorized as "human" is an adult or an infant or child.

In particular, the calculator 16 is configured to estimate a body mass volume of each body categorized as "human", for example, and to determine whether said body is an adult or an infant or child based on the estimated volume.

Further, in an embodiment where the radar sensor 14 is further configured to generate millimeter radio waves or where the intrusion detection system further comprises an additional millimeter sensor to detect millimeter movements, the calculator 16 is configured to determine whether the detected millimeter movements communicated by the radar sensor 14 correspond to breathing, for example.

The calculator 16 identifies a breathing pattern to determine and confirm that the identified body is "human". A breathing pattern is identified by measuring the movement, or rise and fall, of a human's chest. The radar sensor 14 measures a time of flight towards the human's chest, and the calculator 16 is able to identify a specific, repetitive pattern, to confirm that the human is breathing.

The breathing pattern is used as an additional feature, for example, to improve the accuracy of the intrusion detection system 10.

The calculator 16 is further configured to generate an alarm signal.

According to the invention, the calculator 16 is configured to generate the alarm signal only when at least one of the detected body(bodies) is categorized as "human".

In one embodiment, the calculator 16 is configured to generate an alarm signal only when at least one of the detected body(s) is categorized as "human" and said detected body is considered to be an adult.

Alternatively or additionally, the calculator 16 is configured to generate the alarm signal only when at least one of the detected body(bodies) is categorized as "human" and detected millimeter movements corresponding to breathing are performed by said detected body.

In particular, the calculator 16 is configured to generate the alarm signal if and only if at least one of the detected body(bodies) is categorized as "human" and detected millimetric movements corresponding to breathing are performed by said detected body, for example.

In a variant, the calculator 16 is configured to generate the alarm signal if and only if at least one of the detected body(bodies) is categorized as "human", said detected body is determined to be an adult and detected millimeter movements corresponding to breathing are performed by said detected body, for example.

Alternatively or additionally, the calculator 16 is adapted to generate a child detection signal if and only if at least one of the detected body(bodies) is categorized as "human", said detected body is determined to be an infant or child, and millimeter detected movements corresponding to breathing are performed by said detected body.

The calculator 16 is adapted to transmit the child detection signal to a mobile device, such as the vehicle key and/or a smartphone or computer, via a mobile application, for example.

This makes it possible to warn someone, such as an owner of the vehicle, that a child is locked in the vehicle.

Alternatively and/or additionally, the child detection signal is transmitted to the alarm system 18.

The alarm system 18 is configured to trigger an alarm when the calculator generates an alarm signal.

In particular, the alarm system 18 is connected to the calculator so as to receive the alarm signal and generate an alarm when said alarm signal is received.

The alarm is an audible and/or light signal, for example.

In one embodiment, the alarm system 18 is configured to trigger an alarm when the calculator generates a child detection signal.

This is to draw the attention of surrounding persons to the presence of a child locked in the vehicle.

Figure 3:
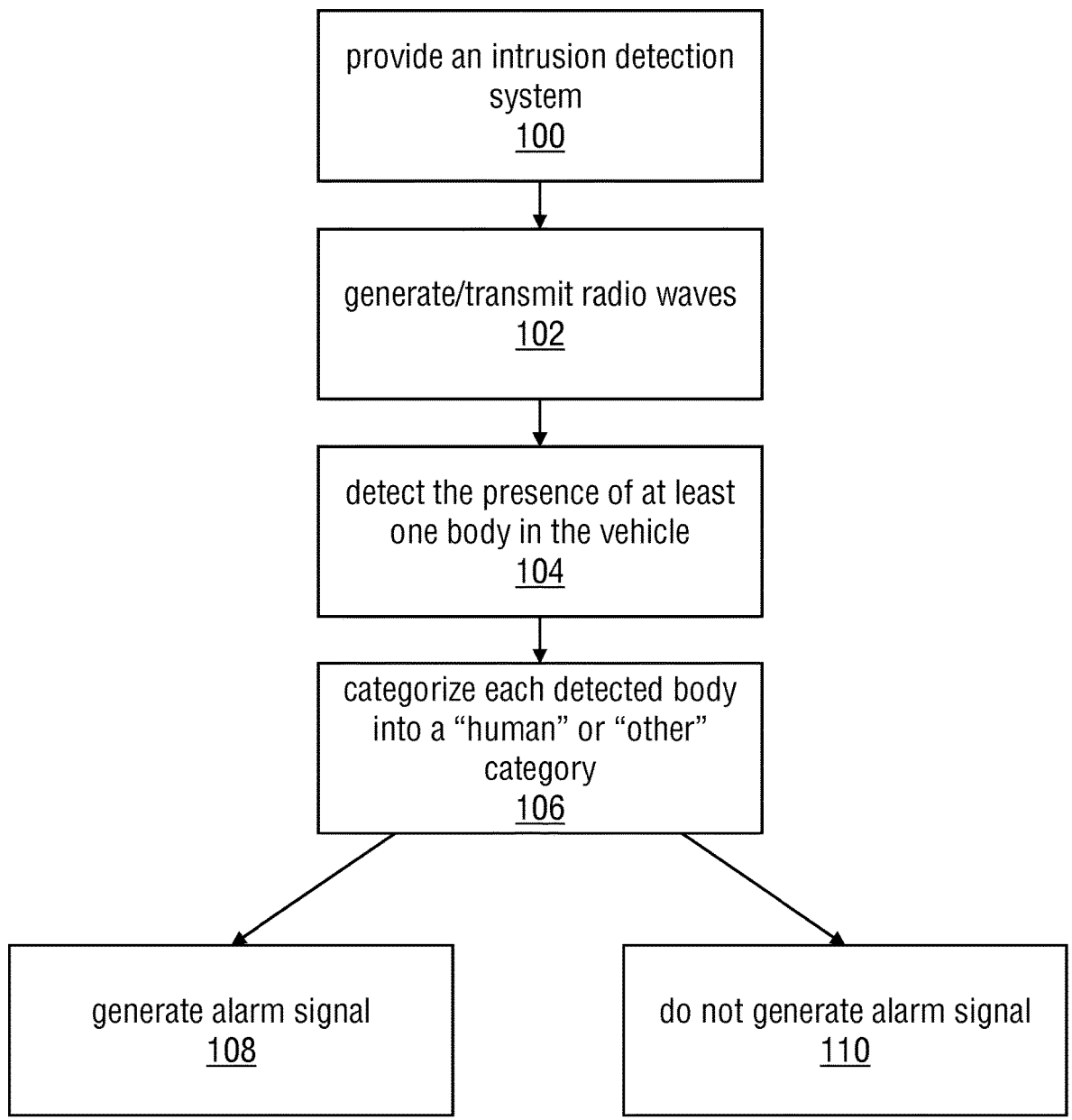
FIG. 3 is a schematic representation of the steps of a method for detecting intrusion into a vehicle according to one embodiment of the method of the invention.

A method for detecting intrusion into a vehicle will now be described with reference to FIG. 3.

The method includes the following steps:
 providing 100 an intrusion detection system 10 as previously described, detecting 104 the presence of at least one body in the vehicle, the calculator 16 categorizing 106 each detected body into a "human" or "other" category, and the alarm system 18 generating an alarm only when at least one of the detected body or bodies is categorized as "human".

The intrusion detection system 10 is activated when the vehicle is locked in a parking mode, for example.

When the intrusion detection system is activated, the radar sensor 14 generates radio waves 20, as described above, in a transmission step 102.

The presence of at least one body is detected within the vehicle, particularly via the reflected radio waves.

As described above, a traffic map or heatmap is generated by the radar sensor 14 based on the reflected radio waves, for example.

In one embodiment, millimeter radio waves having a radio frequency of between 24 GHz and 300 GHz are also generated by the radar sensor 14 or an additional millimeter sensor. Any millimeter movements are thus detected.

The calculator 16 receives the data measured by the radar sensor 14, such as the heatmap data.

In step 106, the calculator 16 categorizes each detected body as either a "human" or "other" category based in particular on the shape of its detected body mass, more particularly on the shape of its body mass detected in the heatmap.

Further, in one advantageous embodiment, the calculator determines whether a body categorized as "human" is an adult or an infant or a child, particularly based on an estimated volume.

In one embodiment, the calculator 16 determines whether the detected millimeter movements correspond to breathing.

The calculator 16 then either generates an alarm signal, in a step 108, or does not generate an alarm signal, in a step 110.

The calculator 16 only generates the alarm signal when at least one of the detected bodies is categorized as human.

The calculator 16 generates the alarm signal in one of the following cases, for example:

when and only when at least one of the detected body (bodies) is categorized as "human", or when and only when at least one of the detected body (bodies) is categorized as "human" and said detected body is considered an adult, or when and only when at least one of the detected body (bodies) is categorized as "human" and millimeter movements corresponding to breathing are detected by said detected body, or when and only when at least one of the at least one detected body is categorized as "human", said detected body is determined to be an adult and detected millimeter movements corresponding to breathing are made by said detected body.

The alarm signal is communicated to the alarm system 18, which then generates an alarm. The alarm is a sound and/or light signal, for example.

In an embodiment, the calculator 16 further generates a child detection signal when and only when at least one of the detected body(bodies) is categorized as "human", said detected body is determined to be an infant or child, and detected millimeter movements corresponding to breathing are performed by said detected body.

The child detection signal is transmitted to a mobile device, for example, such as the vehicle key and/or a smartphone or computer via a mobile application, for example.

Alternatively and/or additionally, the child detection signal is emitted to the alarm system 18, which then generates an alarm.

The aforementioned steps are repeated continuously or regularly at a time interval of between 1 second and 60 seconds, for example.

In one variant, the calculator is further adapted to monitor the approach of a detected body around the vehicle, the approach corresponding to the evolution of the position of said detected body relative to the vehicle.

The calculator is thus adapted to classify said approach as benign or suspicious.

The approach is classified as benign if the body is stationary or passes the vehicle, for example.

The approach is classified as suspicious if the body turns around the vehicle multiple times, for example, in particular and/or if the body gradually approaches the vehicle and/or if the body returns to the vehicle repeatedly.

The calculator incorporates this classification into its calculation and generates an alarm signal as soon as the detected suspect body enters the vehicle, for example.

In another variant, the calculator sends, a warning signal to a mobile device such as a smartphone or computer, for example, via a mobile application, for example.

A user of the smartphone or computer is thus warned of a suspicious approach to the vehicle. In an advantageous embodiment, images from an external camera are further available for viewing by the user.

Alternatively or additionally, the "other" category includes subcategories, such as the "pets" subcategory and the "miscellaneous" subcategory.

The calculator 16 further categorizes any detected body categorized in the "other" category into one of the subcategories.

The calculator 16 has been trained to recognize the shape of different types of pets and/or the shapes of parts of different types of pets, for example, particularly in the heatmap.

For example, heatmap images in particular have been provided with and without pet(s) to the calculator 16, in order to learn to differentiate the shape or partial shape(s) of a pet from other types of mass.

The calculator 16 further generates a pet detection signal when, and only when, at least one of the detected body (bodies) is categorized as "other" and in the "pet" subcategory and, optionally, millimeter detected movements corresponding to breathing are performed by said detected body.

The pet detection signal is similar to the child detection signal described above, for example, and triggers the same consequences.

The intrusion detection system makes it possible to categorize each detected body as a "human" or "other" category, which makes it possible to discriminate between detected bodies, in particular on the basis of this categorization, and to be more selective as to triggering the alarm.

In advantageous optional embodiments, the discrimination may also be based on additional parameters, such as the detection of breath and/or categorization between an adult, a child or an infant.

Further, in advantageous optional embodiments, the system provides additional functionality, such as child and/or pet detection.

The invention claimed is:

1. An intrusion detection system for a vehicle comprising a radar sensor, a calculator and an alarm system adapted to generate an alarm, the radar sensor being adapted to detect the presence of at least one body within the vehicle, the calculator being adapted to categorize each detected body between a "human" category and an "other" category and to trigger the alarm system only when at least one of the at least one detected body is categorized as "human", wherein the radar sensor is adapted to detect a body mass of each of the at least one detected body, the radar sensor being adapted to map surroundings of the radar sensor in a heatmap based on reflected waves, corresponding to radio waves generated by the radar sensor and reflected by the at least one body surrounding said radar sensor, the abscissa and ordinate of each point of the heatmap corresponding to a position of said point in relation to the radar sensor, a value of said point in the heatmap showing at least one parameter of the corresponding reflected waves, and the calculator being adapted to categorize each detected body of the at last one detected body between the "human" category or the "other" category based on the shape of mass of the detected body on the heatmap.

2. The intrusion detection system according to claim 1, wherein the calculator is adapted to estimate a body mass volume of a body categorized as "human" and to determine whether said body is an adult or an infant or child based on the estimated volume.

3. The intrusion detection system according to claim 1, wherein the radar sensor is adapted to use millimeter radio waves to detect millimeter movements or the intrusion detection system further comprises an additional millimeter sensor using millimeter radio waves to detect millimeter movements, the millimeter radio waves having a frequency of between 24 GHz and 300 GHz, the calculator being adapted to determine whether detected millimeter movements correspond to breathing.

4. The intrusion detection system according to claim 3, wherein the calculator is adapted to trigger the alarm system only when at least one of the detected body or bodies is categorized as "human" and when detected millimeter movements corresponding to breathing are made by said detected body.

5. The intrusion detection system according to claim 1, wherein the radar sensor is further adapted to detect the presence of a body around the vehicle, the calculator being adapted to monitor an approach of a detected body around the vehicle.

6. A vehicle comprising an intrusion detection system according to claim 1, the radar sensor being mounted on a body or trim element of the vehicle.

7. The vehicle according to claim 6, wherein the radar sensor is arranged at a center of a ceiling of a passenger compartment of the vehicle, in a center console of the vehicle, or on a center mirror assembly of the vehicle.

8. The intrusion detection system according to claim 1, wherein the at least one parameter comprises the reflectivity of the point.

9. A method for detecting intrusion into a vehicle, comprising the following steps:

providing an intrusion detection system including a radar sensor, a calculator and an alarm system adapted to generate an alarm, detecting the presence of at least one body in the vehicle, the radar sensor being adapted to map surroundings of the radar sensor in a heatmap based on reflected waves, corresponding to radio waves generated by the radar sensor and reflected by the at least one body surrounding said radar sensor, the abscissa and ordinate of each point of the heatmap corresponding to a position of said point in relation to the radar sensor, a value of said point in the heatmap showing at least one parameter of the corresponding reflected waves, the radar sensor being adapted to detect a body mass of each detected body of the at least one body, the calculator categorizing each detected body as either a "human" or "other" category, the calculator being adapted to categorize each detected body of the at least one detected body between the "human" category or the "other" category based on the shape of mass of the detected body on the heatmap, and generating an alarm by the alarm system only when at least one of the at least one detected body is categorized as "human".

10. The method according to claim 9, wherein the intrusion detection system is activated when the vehicle is locked in a parking mode.

11. The method according to claim 9, wherein the at least one parameter comprises the reflectivity of the point.

* * * * *